United States Patent [19]

Uchida et al.

[11] Patent Number: 4,553,705

[45] Date of Patent: Nov. 19, 1985

[54] TOROIDAL CORE WINDING METHOD AND APPARATUS

[75] Inventors: Yoshihisa Uchida, Neyagawa; Kazuichi Yamashita, Kyoto, both of Japan

[73] Assignee: Matsushita Electric Industrial Co., Ltd., Kadoma, Japan

[21] Appl. No.: 584,438

[22] PCT Filed: Jun. 18, 1982

[86] PCT No.: PCT/JP82/00235

§ 371 Date: Feb. 16, 1984

§ 102(e) Date: Feb. 16, 1984

[87] PCT Pub. No.: WO84/00077

PCT Pub. Date: Jan. 5, 1984

[51] Int. Cl.⁴ ...................... H01F 41/08; B65H 81/02; G11B 5/42; G11B 5/20

[52] U.S. Cl. .................................................... 242/4 R

[58] Field of Search .......................... 242/4 R; 29/605

[56] References Cited

U.S. PATENT DOCUMENTS 4,269,366 5/1981 Lindenmeyer ..................... 242/4 R
4,424,939 1/1984 Ohashi et al. ....................... 242/4 R
4,467,972 8/1984 Kaiser ................................ 242/4 R

FOREIGN PATENT DOCUMENTS 56-85811 7/1981 Japan .
56-148812 11/1981 Japan .

*Primary Examiner*—Billy S. Taylor
*Attorney, Agent, or Firm*—Wenderoth, Lind & Ponack

[57] ABSTRACT

The present invention provides a wire winding method and apparatus in which for winding wire on a toroidal core having a hole therethrough, one end of the wire is inserted through the toroidal core from one side thereof, the wire protruding from the toroidal core is drawn out and this drawn out wire is wound on the core, and, then, with a tension applied, the tip of the wire is again inserted through the toroidal core, which operation is repeated. The tip of the wire gripped by a drawing out member is cut between the drawing out member and a gripping member before inserting the end of the wire through the aforementioned toroidal core, the cut being made such that the distance between the gripping position and the tip of the cut wire is a predetermined value, so that the length of wire from the tip to the gripping member is always the same when the wire is inserted through the hole in the core.

3 Claims, 11 Drawing Figures

Fig. 2 (a) (PRIOR ART)
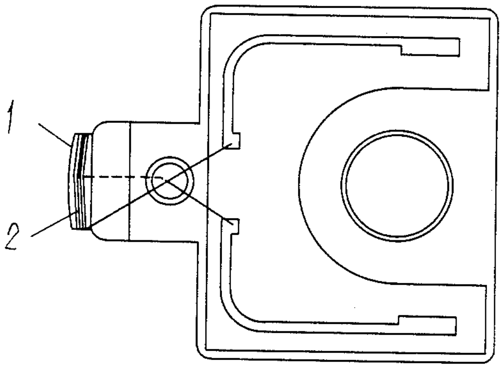
Fig. 2 (b) (PRIOR ART)
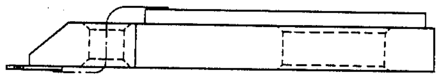

TOROIDAL CORE WINDING METHOD AND APPARATUS

TECHNICAL FIELD

The present invention relates to a wire winder and has as its object winding wire on video heads and magnetic heads for computers, etc., such a head having a minute hole.

BACKGROUND ART

Heretofore, for winding wire through a hollow hole, a toroidal wire winder such as shown in FIG. 1 has been utilized. In such a toroidal wire winder, due to the need for a shuttle or spool to turn through the hollow hole of the object on which the wire is being wound, there is a lower limit for the size of the hollow hole; winding wire through a minute hole with a diameter smaller than 1 mm is impossible. Further, to solve such problems, various wire winding methods have been proposed. They include, for example, (1) pressure feeding the wire along a guide, utilizing a fluid, (2) carrying out magnetic control with a magnetic body attached on the tip of the wire, (3) the tip of the wire is put in the minute core hole and is sucked through by vacuum (Japanese Patent Publication No. 148812 of 1981) and (4) detecting the tip of the wire and making necessary correction for its position. In winding wire with diameter as small as 0.03 mm-0.05 mm on a toroidal core with the minimum hole diameter as small as about 0.25 mm×0.3 mm, the wire passing work poses a grave problem and especially, the reliability in repetitive wire winding or possibility of passing through the hole continuously more than once has been a serious problem. In the method of reinforcing the tip of the wire with a guide piece attached thereon, as used in magnetic control, not only is a separate process required, but there is a lower limit for the size of hole. On the other hand, passing the wire without an attachment on its tip is advantageous in many ways for automation. Reliability in wire passing could not heretofore be ensured because of such difficulties as bending or damage of the wire tip or variation of the length, etc. For these reasons, the wire winding work involving passing it through a hole, as abovedescribed, is considered difficult to automate and is presently done manually, utilizing simple jigs and tools or without using them, although various methods have been proposed.

DISCLOSURE OF THE INVENTION

This invention is characterized in that, in the wire winding method in which for winding wire on a toroidal core having a hollow hole, one end of the wire is inserted through the toroidal core from one side thereof, the wire protruding from this toroidal core is drawn out, the drawn out wire is wound thereabout, then the tip of the wire is again inserted through the toroidal core, with a tension applied, and this operation is repeated, the tip of the wire held by a gripping means is cut before the end of the wire is inserted through the toroidal core; so that the length from the position where the wire is held to its tip is the predetermined value, when inserting the tip of the wire through the core, whereby repetitive positive wire winding while always holding the the tip of wire steady is made possible.

BRIEF DESCRIPTION OF THE DRAWINGS

FIG. 2(*a*) is a plan view of a toroidal core on which wire is to be wound;

FIG. 2(*b*) is a side view of the same;

THE MOST PREFERABLE MODE FOR EXERCISING THE INVENTION

This invention is intended for overcoming the usual difficulties hereabove-described. In the following, an embodiment is described with reference to FIGS. 2-10.

FIGS. 2*a* and 2*b* show a video head, on which wire 2 is wound on a toroidal core 1 having a 0.25 mm×0.3 mm minute hole, 6-20 turns right and left through this hole. In the following, the schematic construction of the device is described.

Composition of the Whole of the Device

Figure 1:
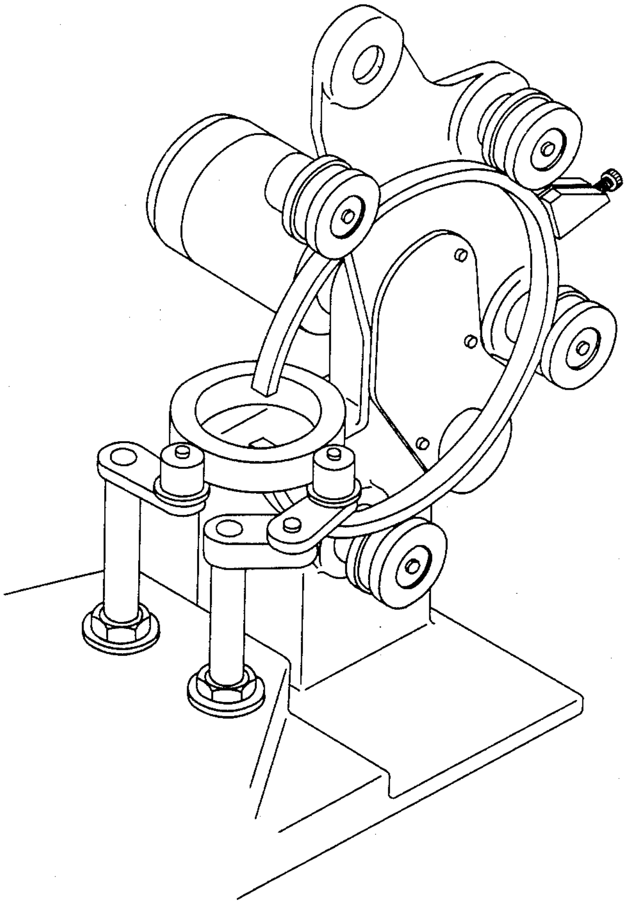
Fig. 1 (PRIOR ART)
FIG. 1 is a prior art perspective view of a toroidal wire winder intended for winding wire through a hollow hole.
Figure 3:
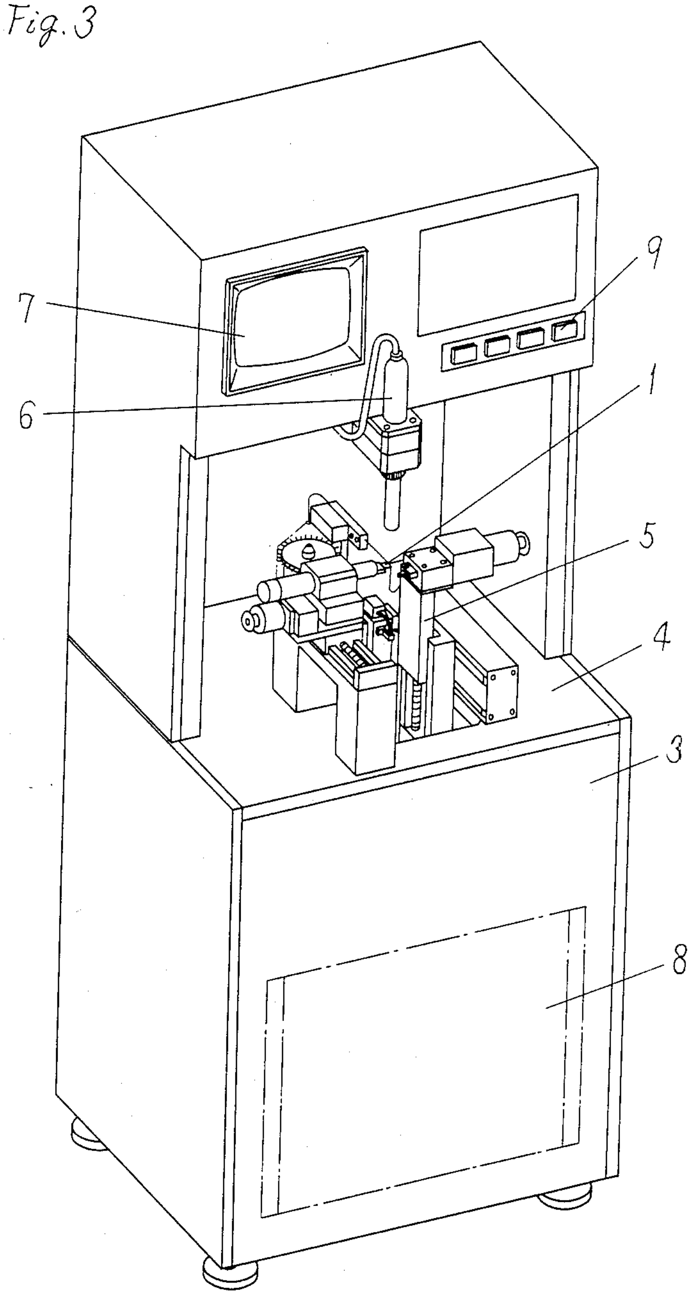
FIG. 3 is a perspective view of a wire winding device embodying this invention.

FIG. 3 is a perspective external view of whole of the device, in which numeral 3 designates the device body; 4 a base plate, which is fixed on the body; 5 a wire winding mechanism, which is incorporated into the device, being placed on the base plate. Numeral 6 designates a TV camera for detection and 7 a monitor TV, both incorporated into the top of this device. The TV camera 6 for detection is located at the top of the wire winding mechanism 5, is for detecting the positions of the minute hole of the toroidal core 1 and the tip of the wire 2. Numeral 8 designates a control unit, and 9 operation switches, the control unit being located at the bottom of the body 3 and the operation switches 9 at the top of the body 3, respectively.

Wire Winding Mechanism

Figure 4:
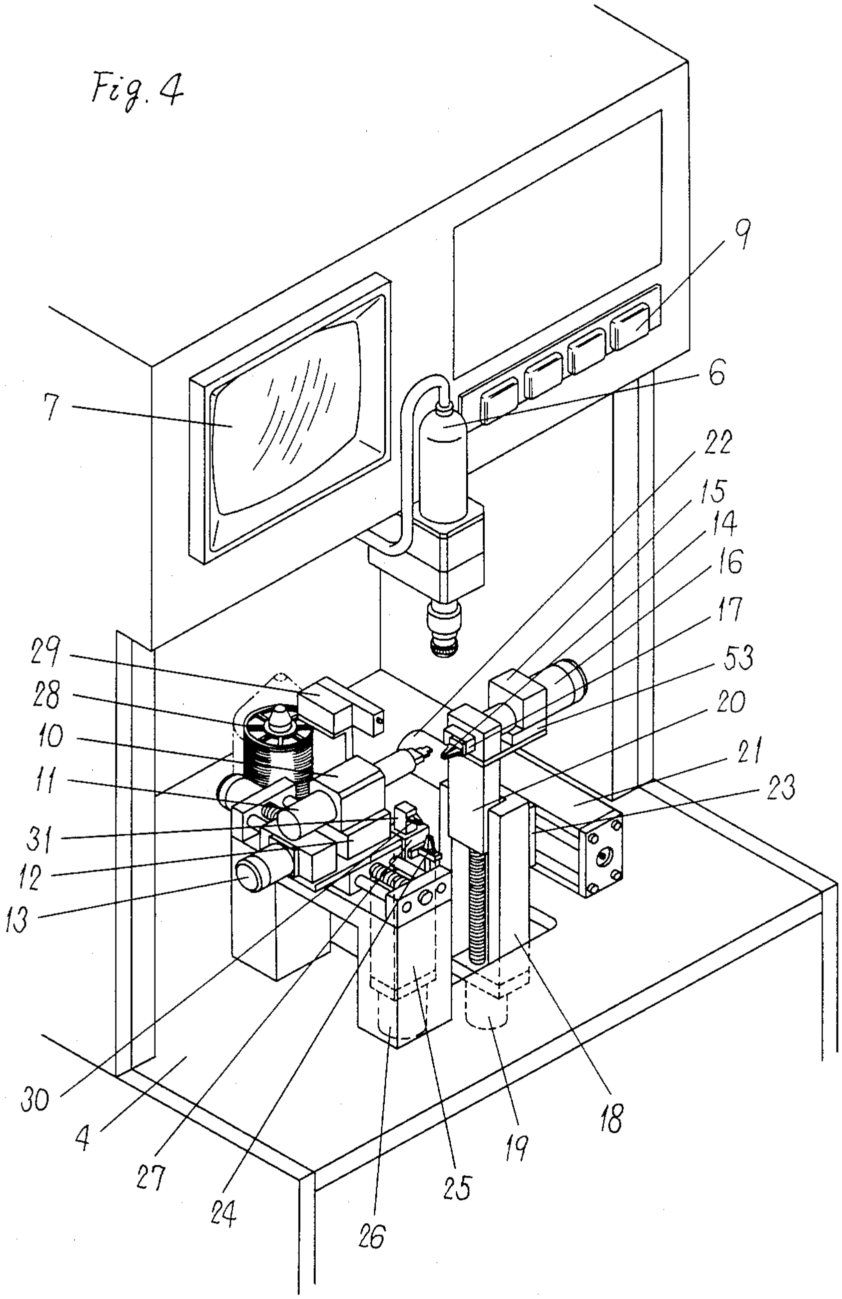
FIG. 4 is a perspective view on an enlarged scale of the wire winding mechanism of this wire winding device.

Referring to FIG. 4, in the wire winding mechanism, 10 designates the work holding part for fixing the toroidal core 1; and 11 the part for rotary drive of the work holding part 10, which turns the toroidal core in opposite directions. Numeral 12 designates an XY transfer part; 13, pulse motors one for each of the X-axis and Y-axis of the XY transfer part, thereby affording movement of the work holding part to any arbitrary positions in the X and Y directions; they are stationarily held on the base plate. The work holding part 10 is clamped on the upper surface of the XY transfer part. Numeral 14 designates a winding chuck for gripping the wire; 15 designates a wiring chuck rotating part; 16 a pulse motor for turning the winding chuck; and 17 an element for clamping the winding chuck 14. The winding chuck 14 is an air chuck which carries out opening-closing movements by means of air, is clamped on the rotary shaft of the winding chuck rotating part 15, but is offset by a definite degree therefrom, and as the rotary shaft of the winding chuck rotating port 15 is driven by the pulse motor, the winding chuck 14 makes a circular movement with an offset radius. The turning angle of the winding chuck is freely set and the chuck may be operated and accurately stopped by the pulse motor. Numeral 18 designates winding chuck vertical drive part; 19 the pulse motor for reciprocal vertical drive; 20 a transfer block, 21 the winding chuck horizontal drive part; 22 a pulse motor for fore-aft drive; and 23 the transfer block of the winding chuck horizontal drive part 21. To the top of the transfer block of the winding chuck vertical drive part 18, winding chuck rotating part 15 is fixed. The winding chuck vertical drive part 18 is driven by the pulse motor 19 and can be accurately stopped at arbitrary positions in the normal direction. The winding chuck vertical drive part 18 is fixed on the transfer block 23 of the winding chuck horizontal drive part 21. The winding chuck horizontal drive part 21 mounted on the base plate 4, is driven by the pulse motor 22 and can be accurately stopped at any arbitrary positions in the horizontal direction.

Numeral 24 denotes a wire passing chuck, 25 a wire passing chuck vertical drive part; 26 a pulse motor; and 27 a transfer block. The wire passing chuck 24 is an air chuck designed to carry out opening-closing movements by means of air, and is arranged coaxially with the center of the minute hole of the toroidal core 1, to grip the wire which has been passed through the minute hole. The transfer block 27 of the wire passing chuck vertical drive part 25 moves vertically in the normal directions and parallel to the center of the minute hole of the toroidal core 1 and on this block, the wire passing chuck 24 is fixed. The wire passing chuck vertical drive part 25 is mounted on the base plate 4, is driven by the pulse motor 26 and can be accurately stopped at arbitrary positions in the normal direction.

Numeral 28 designates a wire supply bobbin, and 29 designates gripping and cutting means for feeding wire and for holding as well as cutting the wire 2.

Cutter Unit

Figure 5:
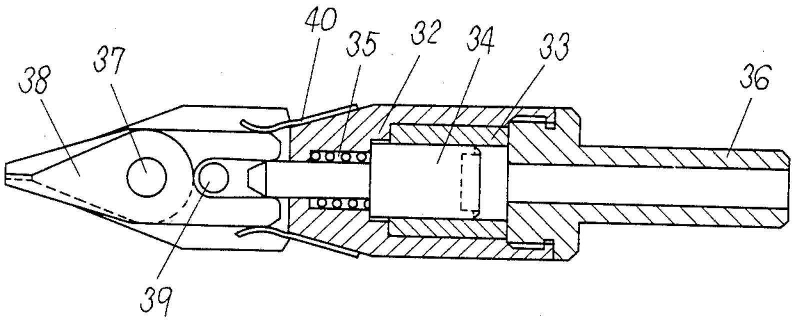
FIG. 5 is a sectional view of the cutting means of this wire winding.

Referring to FIG. 4, numeral 30 denotes a cutter unit, which is designed to cut the wire 2 gripped by the wire passing chuck 24, and is mounted forward of the cutter horizontal drive part 31. The cutter horizontal drive part 31 is mounted at the top of the wire passing chuck 24, makes forward and reverse movements in a direction at a right angle to the center of the minute hole of the toroidal core 1, to be in a relative position where the wire 2 gripped by the wire passing chuck 24 is cuttable; it is fixed to the chuck vertical drive part 27. FIG. 5 shows the structure of the cutter device 30, having a cylinder 33 pressed-in and fitted in the cutter body 32, a piston 34 which slides and fits in the cylinder 33 and a spring for resetting the piston incorporated in the body 32, and a cylinder end 36 provided with an air supply bore threaded into one end. Forward of the cutter body 32, a pair of cutters 38 which rotate around the pin 37 as the fulcrum and cutter stop 39 are provided. The tip of the piston 34 is tapered, abuts on the force applying point of the cutters 38 as the piston 34 goes forward to cause the cutters 28 to rotate and cross for the cutting of the wire 2. Then as the piston 34 goes backward, the pair of cutters 38 are rotated and reset by the springs 40 for cutter reset.

Tension Unit

Figure 6:
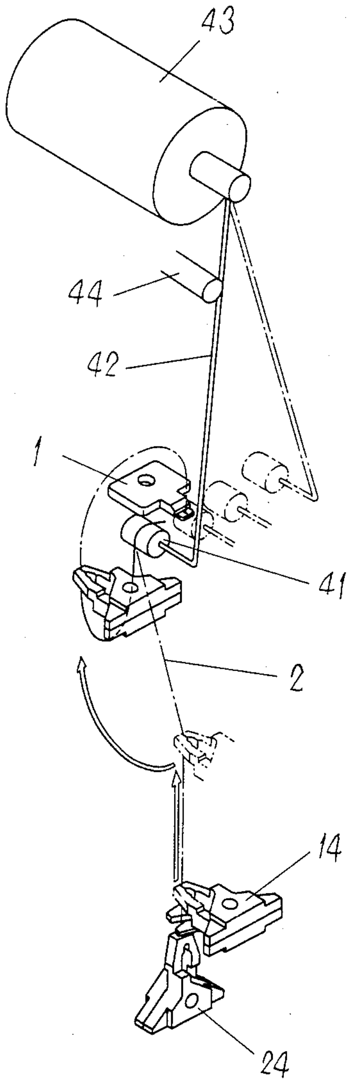
FIG. 6 is a schematic perspective view of the tension applying means of this wire winding device.

FIG. 6 displays a tension unit. In this figure 41 denotes a tension roller; 42 a tension arm; 43 a motor; and 44 an arm stop. One end of the tension arm 42 is bent in the direction transverse to the wire 2, to allow the rotation of the tension roller 41, while the other end of the tension arm 42 is clamped on the rotary shaft of the motor 43. The rotation of the motor 43 is transmitted through the tension arm to the tension roller for it to make an oscillating movement below the toroidal core 1 such that it does not abut the toroidal core, but traverses the center of the hole of the toroidal core 1, thereby not only absorbing the slack in the wire 2, but transferring the wire 2 toward the winding direction of the toroidal core 1, to get the wire curled, thereafter, and the tension arm 42 is stopped by the arm stop 44. The tension force of this tension unit is adjustable by electrically controlling the torque of the motor 43.

Wire Feeding Unit

Figure 7:
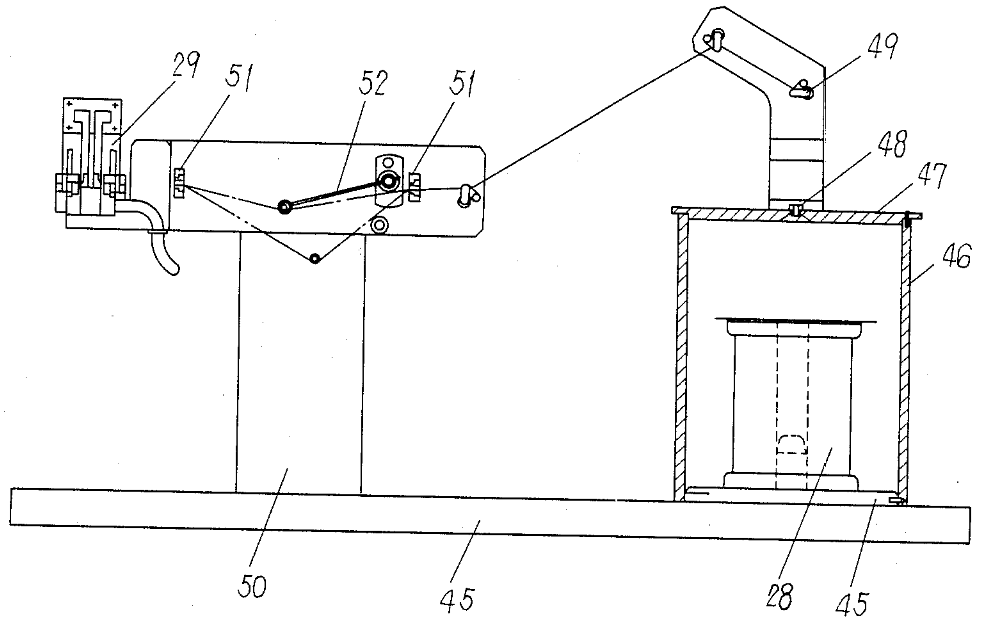
FIG. 7 is a front view of a wire feeding means of this wire winding device.

FIG. 7 shows a wire feeding unit, which as shown in FIG. 4, is designed to feed the wire 2 from the winding bobbin 28. The wire supply bobbin 28 is stationarily installed on bobbin guide 45 clamped on the base plate 4, is covered by a bobbin case 46 which is cylindrical in shape and made of acryl. The wire 2 on the winding bobbin 28 passes through a nozzle 48 mounted on the center of the bobbin case upper lid 47 and wire guide 49, then, goes through nozzles 51 for tension mounted on the wire feeding bracket 50 and past wire feeding tension wire 52 to the gripping and cutting means 29 for wire feeding. The gripping and cutting means 29 for wire feeding has the both the function of gripping and cutting the wire 2, is so constructed that it is holding the wire 2, while winding, and after accomplishing the winding, cuts the wire 2.

The operation procedure of the embodiment as hereabove-described is set forth hereunder:

(1) Feed the toroidal core 1 to the work holding part 10 to be mounted thereon.

(2) Transfer it to the detecting position by means of the XY transfer part 12 carrying the work holding part 10 thereon, detect the position of the hole in the toroidal core 1 by the TV camera 6, thereby taking the reading for shift, and then, make the correction.

(3) Move the wiring chuck horizontal moving part 21 to a gripping and cutting means 29 for wire feeding and feed the wire 2 while gripping it with winding chuck 14.

(4) Wind the wire 2 on the toroidal core 1 at the winding position for the necessary number of turns.

(5) Turn the toroidal core 1 over by the rotation drive part 11 of the work holding part 10 and wind the wire 2 at the other winding position for the necessary number of turns.

(6) Remove the toroidal core 1.

Figure 8:
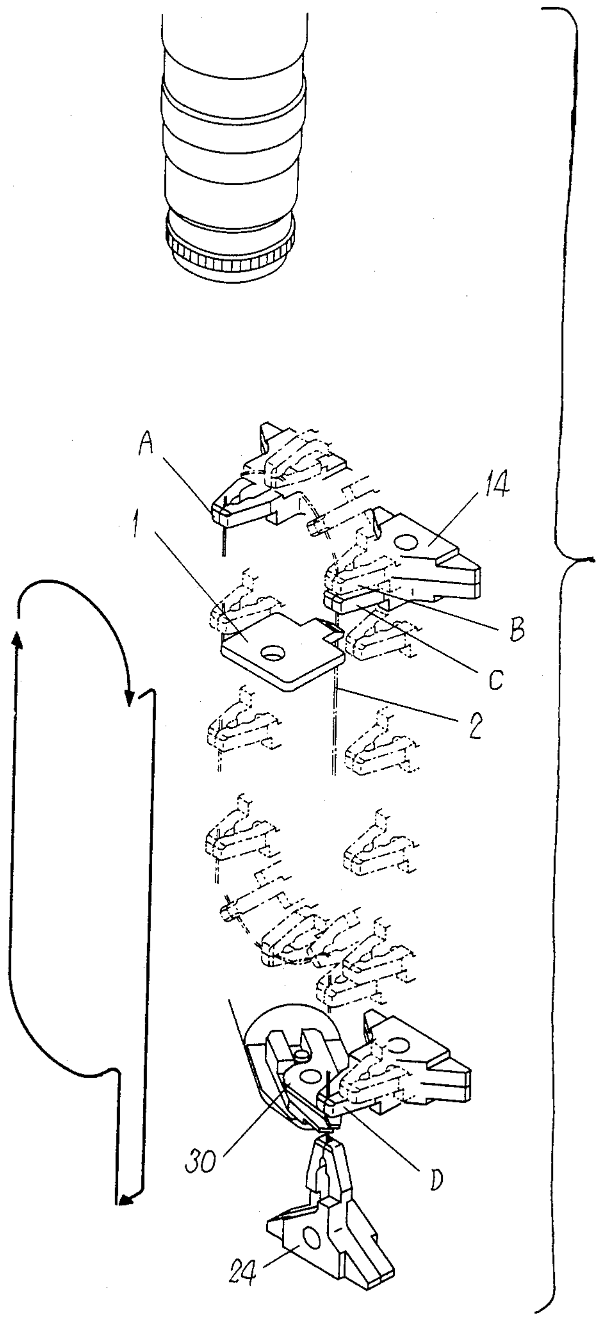
FIG. 8 is an explanatory diagram showing the wire winding operation being continuously performed in this wire winding device.
Figure 9:
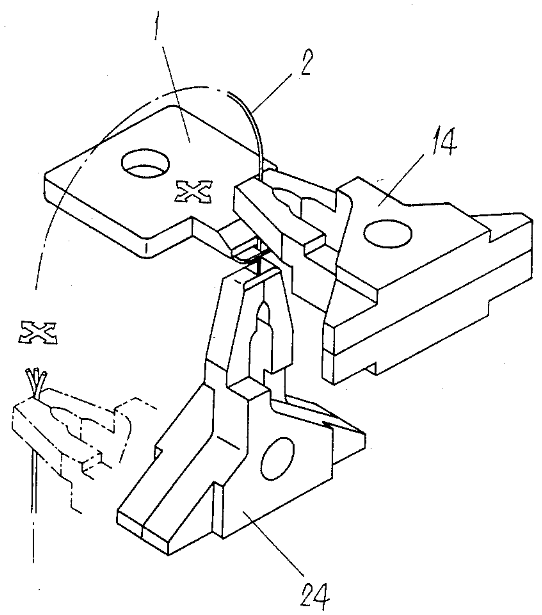
FIG. 9 is an enlarged perspective view of this wire winding device, as seen when passing wire through the core.
Figure 10:
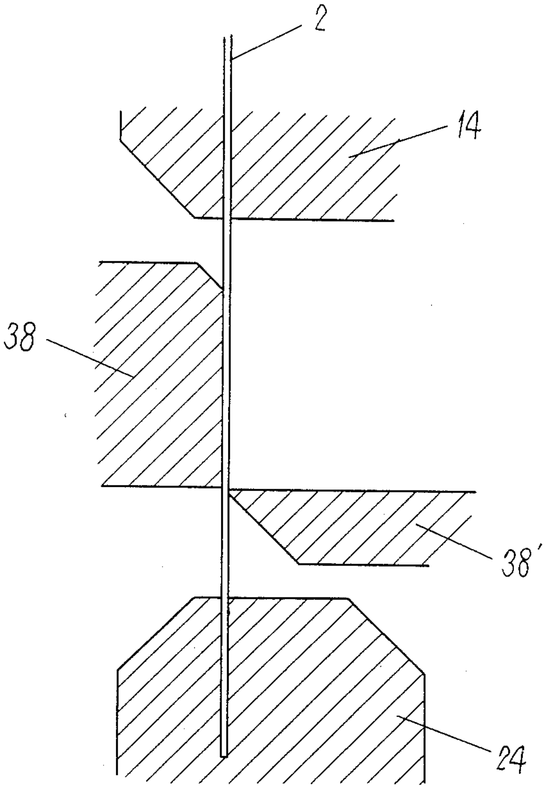
FIG. 10 is an explanatory diagram showing the relative cutting position of parts of this wire winding device.

Now the series of operation steps have been accomplished. The winding method in this embodiment is described in detail, with reference to FIGS. 4–10. FIG. 8 exhibits the continuous operation steps of the winding chuck 14. The main states of the winding chuck are (A) the detecting position, (B) the preparatory position for wire passing, (C) the wire passing position, and (D) regripping and cutting position. The winding chuck 14 completes 1 rotation while passing the states of (A), (B), (C) and (D). At the detecting position (A), the position of the tip of the wires gripped by the winding chuck 14 is read out by means of the TV camera for detection;

then, after correcting the shift by moving the XY transfer part carried by the work holding part 10, the winding chuck 14 is turned 180° by means of the winding chuck turning part 15, until it reaches the preparatory position for wire passing (B). For the turning operation, it is driven by a pulse motor 16 for turning the winding chuck in such a way that every time it is stopped at the correct position. As it is turned 180°, the tip of the wire 2 gripped by the winding chuck 14 is brought downwardly in the normal direction, coinciding with the normal line at the center of the minute hole of the toroidal core, or the targeted position where the wire 2 is passed. It is, then, lowered by means of the winding chuck vertical drive part 18 for moving the winding chuck turning part 15 in the normal direction, to pass the tip of the wire 2 through the minute hole; then, the winding chuck 14 comes to the wire passing position (C). At the wire passing position (C), as shown in FIG. 9, the tip of the wire 2 is protruding under the toroidal core 1 for a distance which permits gripping by the wire passing chuck 24 after passing through the minute hole of the toroidal core 1. Then after gripping the tip of the wire 2 by the wire passing chuck 24, the winding chuck 14 is opened, releasing the wire 2. Then the wire passing chuck 24, while gripping the wire 2, goes down in the normal direction for a predetermined distance by means of the wire passing chuck vertical drive part 25. The wire passing chuck vertical drive part 25 permits free setting of the moving distance, is driven by a pulse motor 26, for correct movement. When the wire passing chuck vertical drive part 25 has descended, the wire 2 gripped by the wire passing chuck 24 is in the state of not being slack in the normal direction to the minute hole of the toroidal core 1. Then the winding chuck 14 not gripping the wire 2 and in its open state is brought back by the winding chuck fore-aft drive part 53 to a position where it does not interfere with the wire 2 and the toroidal core 1, is, then, brought down by means of the winding chuck vertical drive part 18 for the predetermined distance and further, after the winding chuck 14 has gone foreward to a position where it can grip the wire 2, the wiinding chuck is closed to grip the wire 2, and comes to the regripping-cutting position (D). At the regripping-cutting position (D), as shown in FIG. 8, the winding chuck 14 grips the wire a definite distance above the wire passing chuck 24. Then the cutting means 30 is brought forward by means of the cutter horizontal drive part 31, to cut the wire 2. The position of cutting by means of the cutting means 30 is, as shown in FIG. 10, between the winding chuck 14 and the wire passing chuck 24, where the wire has the minimum length from a winding chuck 14 for it to pass through the toroidal core 1, and such that the length from the winding chuck 14 should always be constant. In the cutting means, as shown in FIG. 5, as air is supplied through the cylinder end 36, piston 34 goes foreward, sliding in cylinder 33, acts on the force applying ends of the cutters 38; then, the pair of cutters 38 cut the wire 2 by rotating and crossing. One part of the wire 2 cut is gripped by the winding chuck 14, while the other part is being gripped by the wire passing chuck 24. The wire 2 gripped by the wire passing chuck 24 is discarded as waste, but the wire 2 gripped by the winding chuck 14 needs to be cut without bending its tip for it to be again passed. Therefore, one of the pair of cutters 38, on the side of the winding chuck 14, i.e., the upper cutter 38, has a shape and positional relation such that the wire is brought to the center position of the hole of the toroidal core 1 when cutting the wire 2. The cutter 38' on the side of the wire passing chuck 24, or the lower cutter, moves to the position where it crosses the upper cutter 38, to cut the wire 2. For the wire to be wound through a minute hole, an extremely fine wire with small rigidity is used, the tip of such wire 2 once gripped by the wire-passing chuck 24 sometimes bends, or as it is repetitively gripped, the tip of the wire 2 may be damaged by fatigue or may slip, varying the tip length, thus interfering with wire passing. The purpose of cutting the wire 2 is to prevent this trouble. According to this embodiment, the tip position is detected at every turn. But because the tip length of the wire 2 is constant, not only is such a complex positioning by the automatic focusing not required, but the cut face is not deformed or damaged by the gripping, thus making for easy detection. Setting the length of the wire 2 from the winding chuck 14 at the necessary minimum is to minimize the outside effect, for example, the effects of air resistance, dead weight of the wire, etc., on the tip of the wire 2, because of the very small rigidity of the wire 2.

Then the winding chuck 14 gripping at the regripping-cutting position (D) the wire 2 having a constant length from the winding chuck 14 to the tip of wire 2 and no bent part is turned, while being raised in the normal direction, by means of the winding chuck vertical drive part 18 and the winding chuck rotary drive part 15, to be moved to the detecting position (A). The rising and turning of the winding chuck from the regripping-cutting position (D) to the detecting position (A) are as shown in FIG. 8. By the tension applying means, the wire may be wound on the toroidal core 1 without slackening nor suffering from any damage. When the winding chuck 14 rises while turning from the regripping and cutting position (D) to the detecting position (A), it merely rises in the normal direction and, thereafter, the rising and turning are simultaneously made. During the initial rise for a definite distance, the wire 2 slackens, but this slackening is absorbed by the rotary movement of the tension roller 41 and some tension is applied on the wire.

The tension roller 41 is given a turning motion by a motor 43 through tension arm 42. Then while the wire 2, without slackening, is applying to the toroidal core 1 a definite tension, the tension roller 41 goes on making a circular movement nearby and in the turning direction as the toroidal core 1 in correspondence with the rising of the winding chuck 14. The turning of the tension roller 41 is prevented by arm stop beyond the predetermined rotational angle. But when the rising and turning of the winding chuck 14 are simultaneously done, no slackening of the wire 2 is observed and accordingly, no tension is applied, but the wire 2 once wound on the toroidal core 1 will not come loose.

In this way, the operation of winding the wire 2 on the toroidal core 1 is accomplished for one turn. The aforementioned operation is repeated for the number of times required, but as the winding proceeds, as the wire 2 is wound on the toroidal core 1, the tip of the wire 2 is cut at each turn and a definite length is discarded, causing the length of the wire to shorten. Therefore, the length of the wire 2 which is lessening every time one turn is wound is calculated, to determine the vertical transfer distances of the winding chuck vertical drive part 18 and the wire passing chuck drive part 25.

In the aforementioned embodiment, the tip of the wire is detected to make a correction by the shift, because the hole of the toroidal core 1 is very small. However, if the size of the hole of the toroidal core is larger than the variations at the tip of the wire after it is cut, the detection function is unnecessary.

For the winding motions, the vertical motion in the normal direction and the turning motion are used, but a combination of a motion in the horizontal direction and a turning motion may be employed. For the drive, pulse motors are used, but use of DC motors or other drive elements is permissible.

Further, for the means for cutting wire 2, scissors or like cutters are used, but use of other types of cutters, or such physical means as a laser, a burner, etc., or other cutting means is possible.

The gist of this invention lies in that when winding wire 2 on any object having a hollow hole or similar hole, the tip of the wire 2 gripped by the gripping means is cut every time or every several times of the operation, so that the length from the gripping position to the tip of the wire 2 will be held constant and the variation in the position and condition of the tip of the wire 2 can be reduced.

Industrial Applicability

The present invention enables, regardless of the process of winding, making the state of the tip of wire uniform and carrying out positive repeated winding steps, thereby exhibiting the effect of achieving automation of winding on objects having a minute hole, which has hitherto been performed manually.

What is claimed is:

1. A method of winding a wire onto a toroidal core having a hole therein, comprising:

inserting the tip of one end of the wire through the hole from one side of the toroidal core so that it protrudes from said hole on the other side of said core;

gripping the end of the wire protruding from said hole on the other side of said core and drawing the wire through said hole;

further gripping the thus drawn through wire at a point spaced from the gripped end;

cutting the wire at a predetermined distance toward said gripped end from the point of said further gripping;

while maintaining the further gripping of the thus cut wire, again inserting the tip of the wire formed by said cutting through said hole in said toroidal core from said one side; and repeating said drawing, gripping, cutting and inserting steps for winding the wire on said core.

2. An apparatus for winding a wire onto a toroidal core having a hole therein, comprising:

core holding means for holding the core;

a wire gripping means operable for alternatively gripping and releasing the wire;

moving means on which said wire gripping means is mounted for moving said wire gripping means while gripping the wire for inserting the tip of one end of the wire through the hole from one side of the core so that it protrudes from the hole on the other side of the core, said wire gripping means then being operable for releasing the wire upon completion of the inserting;

a wire drawing out means for gripping the end of the wire protruding from the hole on the other side of the core and drawing the wire through the hole and out from the core until said drawing out means reaches a drawn out position;

said moving means including means for moving said gripping means from the position on the one side of the hole of the core at which the wire has been released to the other side of the core and to a gripping position spaced predetermined distance toward the core from said drawn out position, said gripping means then being operable for gripping the wire at said gripping position; and a cutting means for cutting the wire gripped by said gripping means at said gripping position at a point which is portion of said predetermined distance from said drawn out position, said moving means including means for moving said gripping means from said gripping position to again insert the wire through the hole of the core.

3. An apparatus as claimed in claim 2 in which said moving means comprises means for moving said gripping means from the position on the one side of the hole of the core laterally of said core and then generally parallel to the direction of movement of said drawing out means to a position spaced laterally of said gripping position and then laterally to said gripping position.

* * * * *